(12) United States Patent
Wheeler et al.

(10) Patent No.: US 9,449,010 B2
(45) Date of Patent: Sep. 20, 2016

(54) SYSTEM AND METHOD FOR MANAGING SENSITIVE DATA USING INTELLIGENT MOBILE AGENTS ON A NETWORK

(75) Inventors: Thomas T. Wheeler, Frisco, TX (US); Paul Lipari, Frisco, TX (US)

(73) Assignee: Open Invention Network, LLC, Durham, NC (US)

( * ) Notice: Subject to any disclaimer, the term of this patent is extended or adjusted under 35 U.S.C. 154(b) by 65 days.

(21) Appl. No.: 13/078,940

(22) Filed: Apr. 2, 2011

(65) Prior Publication Data

US 2012/0254129 A1    Oct. 4, 2012

(51) Int. Cl.
*G06F 17/00* (2006.01)
*G06F 17/30* (2006.01)

(52) U.S. Cl.
CPC .............................. *G06F 17/30129* (2013.01)

(58) Field of Classification Search
CPC ........... G06F 11/1453; G06F 2201/84; G06F 11/1464; G06F 11/1469; G06F 17/30578
USPC ................................................. 707/679, 822
See application file for complete search history.

(56) References Cited

U.S. PATENT DOCUMENTS

| | | | | |
|---|---|---|---|---|
| 5,721,916 A | * | 2/1998 | Pardikar | G06F 17/30132 |
| 6,233,601 B1 | * | 5/2001 | Walsh | G06F 9/465 |
| | | | | 709/202 |
| 2001/0029526 A1 | * | 10/2001 | Yokoyama et al. | 709/218 |
| 2002/0087914 A1 | * | 7/2002 | Sarra | G06F 11/0715 |
| | | | | 714/15 |
| 2005/0278279 A1 | * | 12/2005 | Petev et al. | 707/1 |
| 2011/0016163 A1 | * | 1/2011 | Prahlad et al. | 707/809 |

* cited by examiner

*Primary Examiner* — Truong Vo
(74) *Attorney, Agent, or Firm* — Haynes and Boone, LLP

(57) ABSTRACT

In order to manage stale data on a network of computer systems, a file harvester agent may be configured with a list of stale data files to be deleted. The file harvester agent may be deployed to the computer systems of a network. When executed in a computer system, the file harvester agent searches the file system of the computer system to locate any files or data indicated in the file list. Any located data files are deleted. Once the agent has finished processing the file list on a computer system, the agent can copy or replicate itself to other computer systems of the network in accordance with a pre-configured itinerary.

10 Claims, 5 Drawing Sheets

SYSTEM AND METHOD FOR MANAGING SENSITIVE DATA USING INTELLIGENT MOBILE AGENTS ON A NETWORK

FIELD OF THE INVENTION

This disclosure relates to systems and methods for managing data on a network and in particular to managing old data.

BACKGROUND OF THE INVENTION

In a networked computer environment, multiple copies of data are often passed around from system to system. In many cases, the copies become stale due to being out of date, no longer needed, or because they expose data that is a security risk. In these situations, it is desirable to delete the stale copies. However, tracking and deleting the stale copies is difficult or impossible. There may be no mechanism for determining which systems received the data, and the destination system may not have installed an application or service to detect and delete stale data.

The primary mechanism currently in use to handle this problem is to limit the copying of data to prevent it from becoming stale. When the data is only stored in one central location (e.g. a single database, a single file on a particular machine's hard drive) access control, deletions, and updates can be performed by a single application. In other cases, it may be the responsibility of the user to locate and delete stale data.

It is often useful or necessary to create copies of data. A central database or filesystem may be inadequate for several reasons, such as scalability concerns, user convenience, or application responsiveness. Relying on users to locate and delete stale data is error prone. Consequently, what is needed is a mechanism to locate and delete stale data regardless of where it has been copied.

SUMMARY OF THE INVENTION

In one aspect of the disclosure, there is provided a method for managing data on a computer network comprising a plurality of computer systems. The method may comprise deploying an agent to at least one computer system and searching a file system of the computer system to locate and delete one or more data elements identified in the agent.

In one aspect of the disclosure, there is provided an agent comprising an agent mover and a file harvester. The agent mover may be configured to move the agent to a plurality of computer systems of a network. The file harvester may be configured to search a filesystem of a computer of the network to locate one or more files and cause the located one or more files to be deleted.

In one aspect of the disclosure, there is provided a computer system comprising at least one processor, at least one memory operatively associated with the at least one processor, and a management application executable on the at least one processor. The management application may be configured to generate a harvester agent and configure the harvester agent with a filelist comprising one or more files to be deleted at one or more computer systems of a network. The management application may also be configured to deploy the harvester agent to the one or more computer systems of the network.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
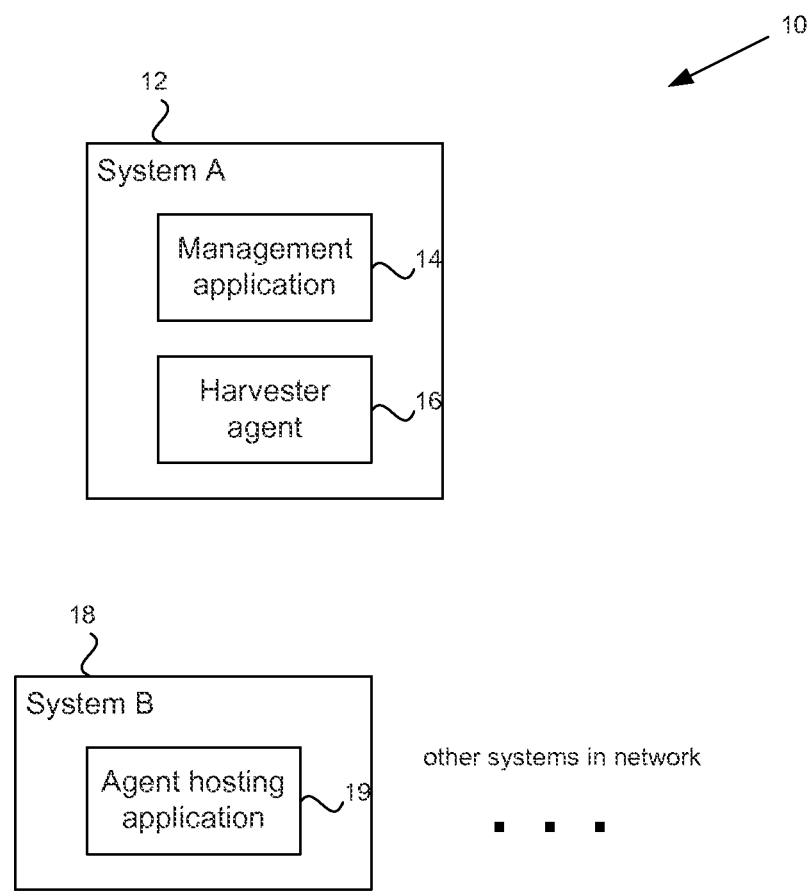
FIG. 1 shows a network of computer systems.

In FIG. 1, there is shown a system 10 that includes a first computer system which may comprise one or more processors and one or more memories. System A 12 may execute a management application 14 that creates and deploys a harvester agent 16 as will be described in more detail below. The system 10 may further include one or more second computer systems 18 that comprise one or more processors and one or more memories. System B 18 may execute an agent hosting application 19 that is able to receive and host the harvester agent 16. While only a single System A 12 and a single System B 18 is depicted in FIG. 1, in practice, the network may include any number of the respective systems. Each of System A 12 and System B 18 may be a fixed computer, mobile computer (e.g. laptop, mobile phone, music player, etc.), server, etc. System A and System B are thus able to communicate using any suitable network protocol.

The harvester agent 16 is a mobile agent that can be used to locate and delete stale data. The agent 16 is able to move from system to system across the network, and identify and delete stale data on each system. The agent carries with it both the means to identify the stale data and the means to delete it.

Figure 2:
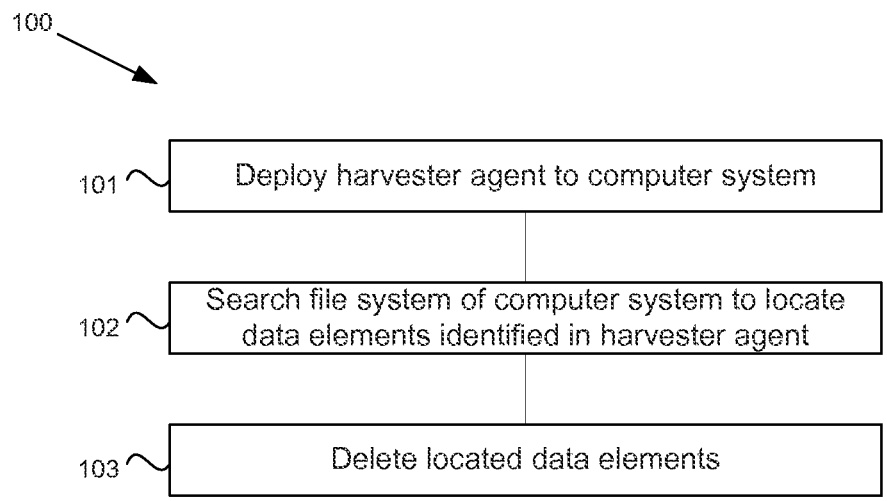
FIG. 2 depicts a method for managing data on the network of computer systems.

A method for managing data on the network of computer systems 18 is depicted in the flowchart 100 of FIG. 2. At step 101, the harvester agent is deployed to a computer system 18. The harvester agent searches a file system of the computer system to locate any data elements indicated in the harvester agent 16 (step 102). Any located data elements are deleted (step 103).

Figure 3:
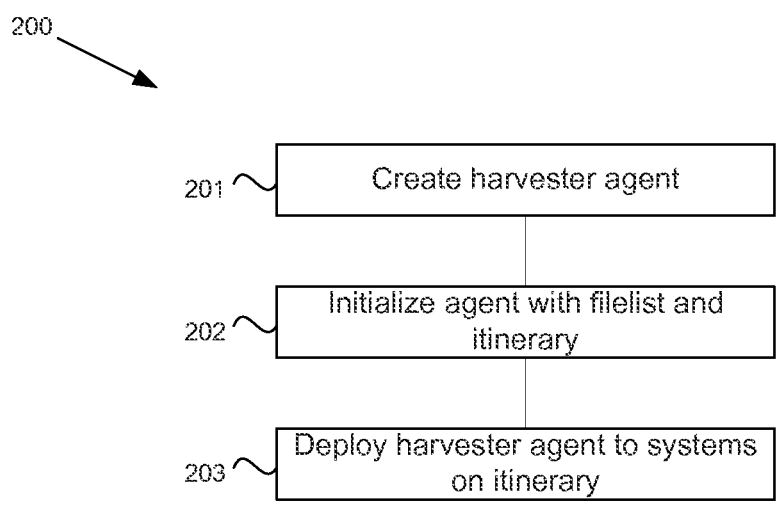
FIG. 3 depicts a method for creating and deploying a harvester agent.

A process undertaken by the management application 14 is depicted in the flowchart 200 of FIG. 3. The management application 14 creates an intelligent mobile agent (the "harvester agent") at step 201 and initializes it (step 202) with (1) information that enables the agent to locate stale data, (2) information that enables the agent to delete stale data once it has been located, and (3) information that enables the agent to determine which systems it will visit (the itinerary). The management application 14 then deploys the harvester agent to the systems 18 on the network (step 203).

Figure 4:
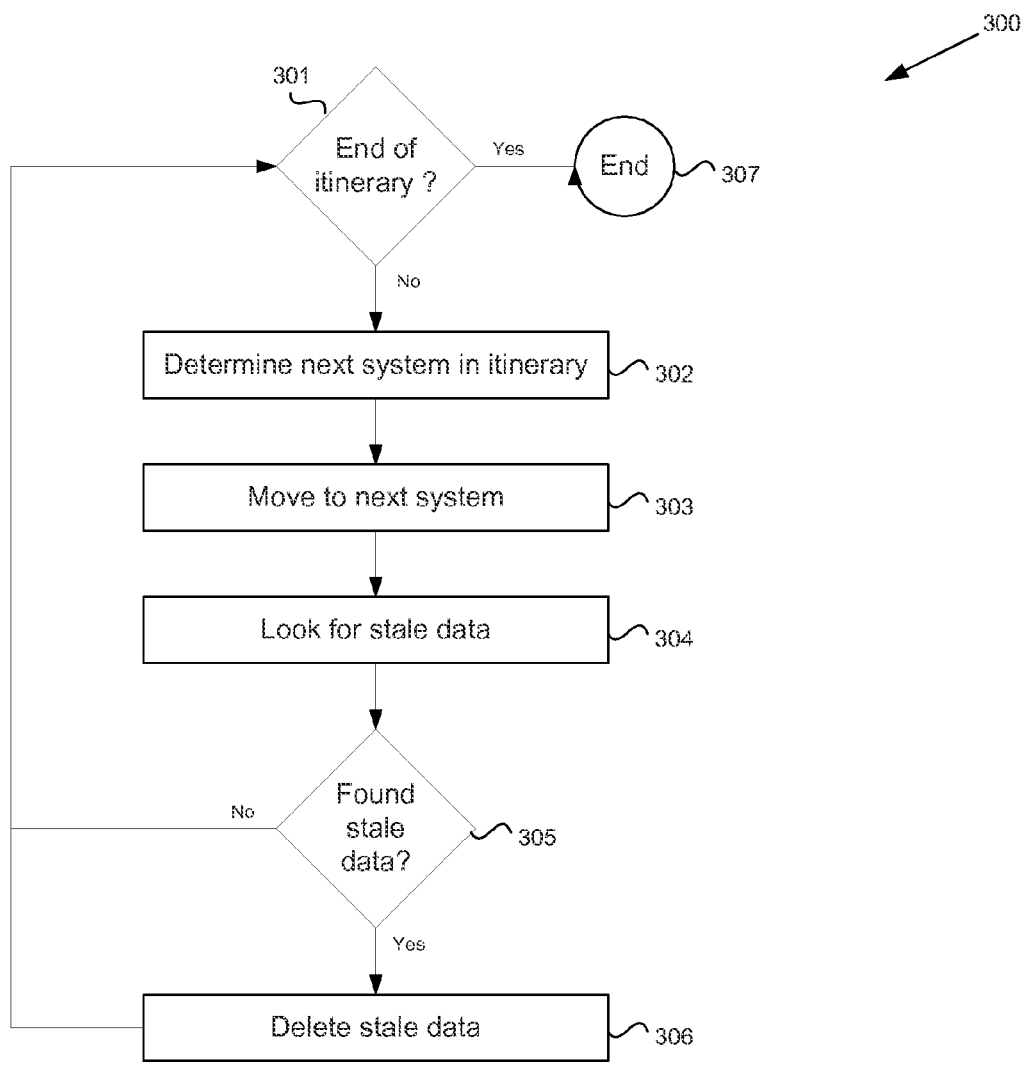
FIG. 4 depicts a method of operation of a harvester agent.

The agent then moves from system to system. A process undertaken by the harvester agent 16 is depicted in the flowchart 300 of FIG. 4. At step 301, the agent after deployment determines if it has finished the itinerary. If so, the process ends (step 307). Otherwise, the agent determines the next system in the itinerary 302 and moves to that system 303. Once installed by the agent hosting application 19 on the respective system, the harvester agent looks for stale data 304 that matches data provided at initialization of the harvester agent. If the harvester agent finds stale data (determination 305), the harvester agent deletes the stale data from the system 306, before returning to step 301 to continue processing of the itinerary.

At each system, the agent attempts to locate the stale data using the information provided at initialization time. If the agent finds stale data, it deletes it using the information provided at initialization time. The agent then moves to the next system. When the agent has visited each system, it terminates operation.

In order for the harvester agent 16 to move and operate at each system, each system 18 must have an agent hosting application 19 operable to receive the agent and be able to execute it. The agent hosting application 19 may be a dedicated application designed for the agent, or a generalized framework for receiving and executing intelligent mobile agents.

Figure 5:
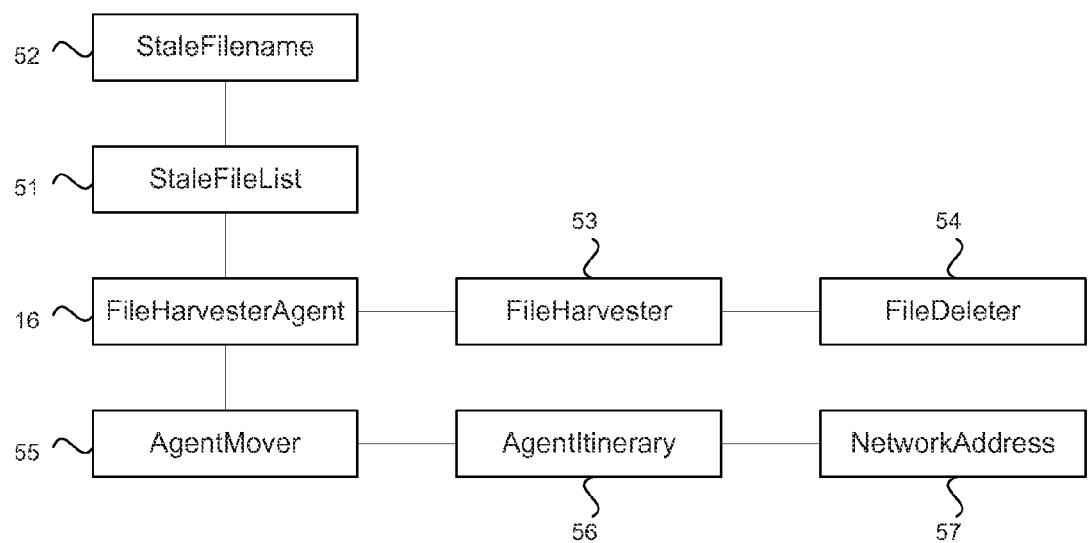
FIG. 5 depicts a structure of a harvester agent.
Figure 6:
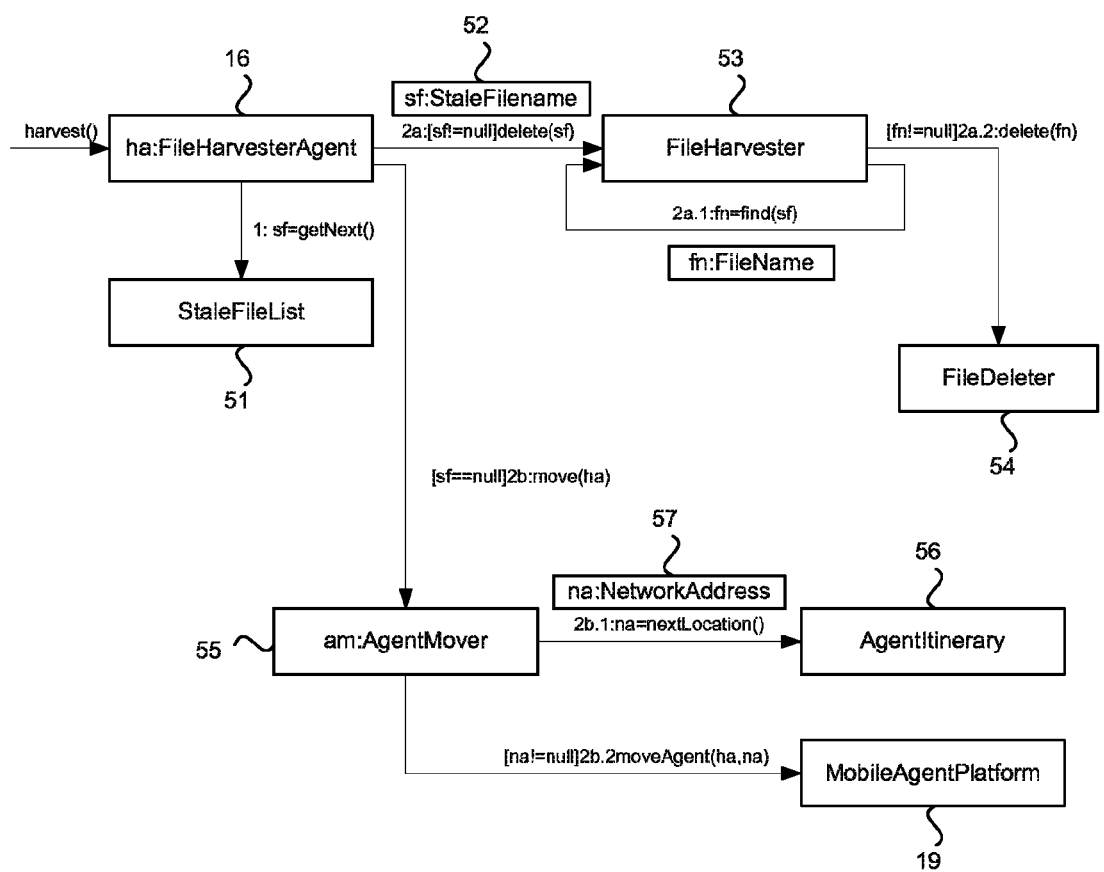
FIG. 6 depicts processing interactions between elements of the harvester agent.

The following description of the operation of a harvesting agent that looks for and deletes stale data files in a filesystem on a device makes reference to FIG. 5 which depicts a structure of the harvester agent 16 and FIG. 6 which shows the processing interactions of the harvester agent.

On arrival within the mobile agent platform 19 running on a system, the FileHarvesterAgent 16 loops over the StaleFileList. For each StaleFilename 52 in the list, the FileHarvesterAgent 16 passes the StaleFilename 52 to a FileHarvester 53. The FileHarvester 53 uses the information in the StaleFilename 52 to search for the file in the system's filesystem. The StaleFilename 52 includes part or all of the stale file's path and name, thus different versions of a file may be located. If the search finds the stale file, the FileHarvester 53 passes the FileName to a FileDeleter 54 with a command to delete the file. The FileDeleter 54 may be an operational part of the FileHarvesterAgent 16, the FileHarvester 53, or the MobileAgentPlatform 19. The FileDeleter uses operating system operations to delete the file.

When all entries in the StaleFileList 51 have been processed, the FileHarvesterAgent 16 sends a command to the AgentMover 55 to move itself. The AgentMover 55 obtains the next NetworkAddress 57 to visit from the AgentItinerary 56. If there is a next NetworkAddress 57, the AgentMover 55 sends a command to the MobileAgentPlatform 19 to move the agent, passing the FileHarvesterAgent 16 and the NetworkAddress 57 to move to.

The MobileAgentPlatform 19 then operates to obtain a network connection to the destination system specified by the NetworkAddress 57 and transfer the FileHarvesterAgent 16 to the MobileAgentPlatform on that system. When the FileHarvesterAgent arrives, the MobileAgentPlatform on that system sends a command to the agent to harvest. This process of moving and harvesting continues until there are no more entries in the AgentItinerary 56. At this point the agent ceases operation.

The information enabling the agent to locate stale data may be one or more of: a partial or complete file path and/or filename; a unique hash for the information stored in a file; a specific subset of the data stored in a file; a date stamp of a file; a partial or complete database statement; a unique identifier ("key") for a record in a database; or other identifying information that enables the agent to locate stale data on a system.

The information enabling the agent to delete stale data may be one or more of: a partial or complete database statement; or other commands or information that enable the agent to perform operations to delete stale data on a system.

The information enabling the agent to determine its itinerary may consist of one or more of: a set of hostnames and/or IP addresses with ports; a range of IP addresses and a port or ports; or any other information identifying the systems comprising the agent's itinerary.

The agent may send, or broadcast, multiple copies of itself from one system to other systems and may dynamically modify the agent itinerary to prevent multiple harvesting operations on a single system. Alternatively or in addition, the agent may have a capability for determining whether it has already visited a particular system and, if so, to not operate to locate and destroy stale data on that system. The agent may have a capability to keep track of the systems it has visited and to not move to systems it has already visited.

The agent may report back to the management application information about the systems it has visited and its operations on each system. It may do this by making a direct network connection to the management application, by storing reporting data in a database or other storage accessible by the management application, or by some other means.

The harvesting of the stale data is described herein as being deleted. The deletion of the data may be a wiping of the data from the memory of the system, as well as other deletion methods such as quarantining or otherwise isolating the data so that the data may not be viewed or executed. Equivalent deletion methods are intended to be encompassed herein.

In various embodiments, the harvester agent 16 may be implemented as a stand-alone application that is distributed across various systems; or as a library to be utilized by such an application.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for managing data on a computer network comprising a plurality of computer systems, the method comprising:

configuring an agent at a first computer system of the plurality of computer systems, with a list comprising one or more entries, at least one entry of the one or more entries comprising a complete filename;

configuring the agent with an itinerary that specifies a plurality of second computer systems of the computer network for the agent to deploy itself to;

after configuring the agent with the list of one or more files and the itinerary, deploying the agent from the first computer system to a first of the second computer systems of the plurality of second computer systems specified in the itinerary;

searching a first filesystem of the first of the second computer systems using the agent to locate one or more files of the first filesystem that have a complete filename that matches a complete filename of an entry in the list;

deleting the located one or more files located on the first filesystem of the a first of the second computer systems;

determining by the agent from the itinerary a next second computer system of the plurality of second computer systems;

moving the agent from the first of the second computer systems to the next of the second computer systems;

searching a second filesystem of the next of the second computer systems using the agent to locate one or more files of the second filesystem that have a complete filename that matches a complete filename of an entry in the list; and deleting the located one or more files located on the second filesystem of the next of the second computer systems.

2. The method of claim 1 comprising configuring the agent with a stale file list comprising a plurality of entries that indicate one or more files to be searched for and deleted.

3. The method of claim 2 wherein the plurality of entries comprise one or more of a partial file path, a partial filename, a complete filepath, a complete filename, a unique hash for the information stored in a file, a specific subset of data stored in a file, a date stamp of a file, a partial database statement, a complete database statement, and a unique identifier for a record in a database.

4. The method of claim 2 comprising deploying the agent to a plurality of the plurality of computer systems and processing the stale file list at each of the plurality of computer systems to which the agent is deployed.

5. The method of claim 1 comprising moving the agent o a second computer system of the plurality of computer systems.

6. The method of claim 5 comprising configuring the agent with an agent itinerary and moving the agent according to the agent itinerary.

7. The method of claim 1 comprising reporting one or more actions of the agent to a management application.

8. The method of claim 7 wherein the one or more actions comprise one or more files deleted on a computer system.

9. A non-transitory computer readable medium comprising instructions executable by at least one processor, the computer readable medium comprising instructions for:

configuring an agent at a first computer system of the plurality of computer systems, with a list comprising one or more entries, at least one entry of the one or more entries comprising a complete filename;

configuring the agent with an itinerary that specifies a plurality of second computer systems of the computer network for the agent to deploy itself to;

after configuring the agent with the list of one or more files and the itinerary, deploying the agent from the first computer system to a first of the second computer systems of the plurality of second computer systems specified in the itinerary;

searching a first filesystem of the first of the second computer systems using the agent to locate one or more files of the first filesystem that have a complete filename that matches a complete filename of an entry in the list;

deleting the located one or more files located on the first filesystem of the a first of the second computer systems;

determining by the agent from the itinerary a next second computer system of the plurality of second computer systems;

moving the agent from the first of the second computer systems to the next of the second computer systems;

searching a second filesystem of the next of the second computer systems using the agent to locate one or more files of the second filesystem that have a complete filename that matches a complete filename of an entry in the list; and deleting the located one or more files located on the second filesystem of the next of the second computer systems.

10. A computer system comprising:

at least one processor;

at least one memory operatively associated with the at least one processor;

wherein the processor is configured to:

configure an agent at a first computer system of the plurality of computer systems, with a list comprising one or more entries, at least one entry of the one or more entries comprising a complete filename;

configure the agent with an itinerary that specifies a plurality of second computer systems of the computer network for the agent to deploy itself to;

after the agent is configured with the list of one or more files and the itinerary, deploy the agent from the first computer system to a first of the second computer systems of the plurality of second computer systems specified in the itinerary;

search a first filesystem of the first of the second computer systems using the agent to locate one or more files of the first filesystem that have a complete filename that matches a complete filename of an entry in the list;

delete the located one or more files located on the first filesystem of the a first of the second computer systems;

determine by the agent from the itinerary a next second computer system of the plurality of second computer systems;

move the agent from the first of the second computer systems to the next of the second computer systems;

search a second filesystem of the next of the second computer systems using the agent to locate one or more files of the second filesystem that have a complete filename that matches a complete filename of an entry in the list; and delete the located one or more files located on the second filesystem of the next of the second computer systems.

* * * * *